United States Patent [19]

Laiho et al.

[11] Patent Number: 5,700,586
[45] Date of Patent: Dec. 23, 1997

[54] LAMINATE AND PRODUCTION METHOD THEREOF

[75] Inventors: Erkki Laiho; Markku Sainio, both of Porvoo, Finland

[73] Assignee: Borealis Polymers Oy, Porvoo, Finland

[21] Appl. No.: 284,435

[22] PCT Filed: Feb. 19, 1993

[86] PCT No.: PCT/FI93/00060

§ 371 Date: Aug. 12, 1994

§ 102(e) Date: Aug. 12, 1994

[87] PCT Pub. No.: WO93/16877

PCT Pub. Date: Sep. 2, 1993

[30] Foreign Application Priority Data

Feb. 19, 1992 [FI] Finland ................. 920703

[51] Int. Cl.$^6$ ............................................. B32B 9/00
[52] U.S. Cl. .................. 428/507; 428/508; 428/516; 428/703.3; 264/171; 156/244.11
[58] Field of Search ................. 428/34.2, 507, 428/508, 516, 903.3; 264/171; 156/244.11

[56] References Cited

U.S. PATENT DOCUMENTS

| | | | |
|---|---|---|---|
| Re. 32,270 | 10/1986 | Murray, Jr. | 428/33 |
| Re. 33,376 | 10/1990 | Gibbons et al. | 428/34.2 |
| 4,082,877 | 4/1978 | Shadle | 428/35 |
| 4,337,297 | 6/1982 | Karim et al. | 428/461 |
| 4,475,241 | 10/1984 | Mueller et al. | 383/113 |
| 4,513,036 | 4/1985 | Thompson et al. | 428/35 |
| 4,698,246 | 10/1987 | Gibbons et al. | 428/35 |
| 4,701,360 | 10/1987 | Gibbons et al. | 428/35 |
| 4,789,575 | 12/1988 | Gibbons et al. | 428/34.2 |
| 4,795,665 | 1/1989 | Lancaster et al. | 428/34.2 |
| 4,826,493 | 5/1989 | Martini et al. | 428/332 |
| 4,880,592 | 11/1989 | Martini et al. | 264/514 |
| 4,894,267 | 1/1990 | Bettle, III et al. | 428/36.7 |
| 4,906,517 | 3/1990 | Akao et al. | 428/216 |
| 4,977,004 | 12/1990 | Bettle, III et al. | 428/36.7 |
| 5,059,459 | 10/1991 | Huffman | 428/34.2 |
| 5,114,626 | 5/1992 | Huffman | 264/80 |
| 5,133,999 | 7/1992 | Löfgren et al. | 428/34.2 |
| 5,213,858 | 5/1993 | Tanner et al. | 428/34.2 |
| 5,225,256 | 7/1993 | Marano et al. | 428/34.2 |
| 5,296,070 | 3/1994 | Take et al. | 156/244.1 |

FOREIGN PATENT DOCUMENTS

| | | |
|---|---|---|
| 0010171 | 8/1981 | European Pat. Off. . |
| 0085919 | 7/1986 | European Pat. Off. . |
| 9314642 | 5/1993 | European Pat. Off. . |

*Primary Examiner*—Patrick Ryan
*Attorney, Agent, or Firm*—Birch, Stewart, Kolasch & Birch, LLP

[57] ABSTRACT

The invention concerns laminates incorporating plastic layers and cellulose fiber layers and a method for the production thereof. The plastic layers and the cellulose fiber layers incorporated in the laminates can be separated intact from each other in aqueous defibering by virtue of a water-soluble polymer layer placed adjacent to the fibrous layer whereby all components of the laminate become recyclable for reuse. The laminates can be produced using extrusion coating/laminating methods. The laminates according to the invention are suited to use as, e.g., wrapper and packaging materials.

19 Claims, 1 Drawing Sheet

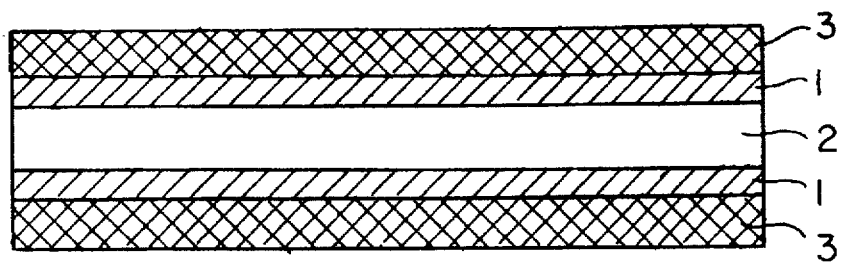
F I G. 1
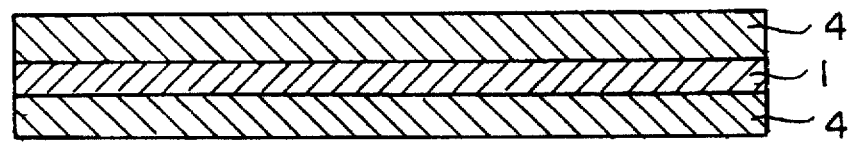
F I G. 2
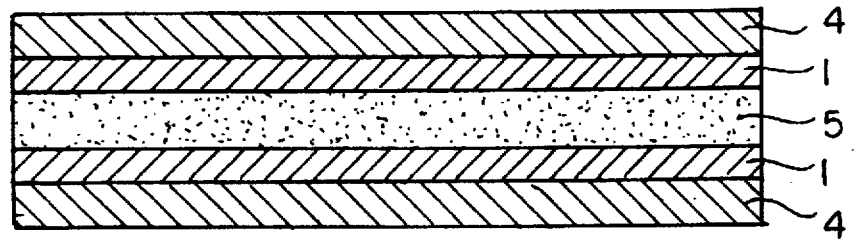
F I G. 3
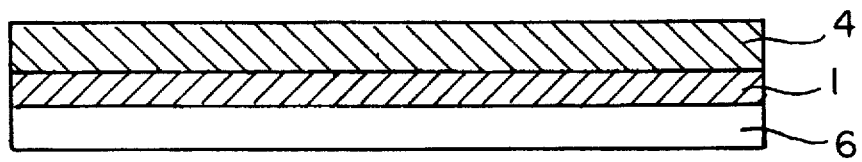
F I G. 4

LAMINATE AND PRODUCTION METHOD THEREOF

BACKGROUND OF THE INVENTION

1. Field of the Invention

The present invention is related to a laminate according to the preamble of claim 1.

Such a laminate incorporates at least one first layer comprised of cellulose fibers, at least one second layer spaced apart the first layer, said second layer being comprised of a material which is at least substantially insoluble in water, and at least one third layer which is arranged between said first and said second layer and is capable of interbonding said layers.

The invention also concerns a method for producing this laminate, and the use thereof.

2. Description of the Related Art

Growing environmental problems, limited capacities of dump sites and resultant constraints imposed by the tightening regulatory measures require an increasing degree of recycling in all activities, including the packaging sector. Traditionally, paper and paperboard have been utilized in recycling by way of repulping, that is, defibering of an aqueous waste paper slush. The industry also makes use of repulping methods compatible with combination fiber/plastic systems. The goal has been to separate plastic from fibre to the highest degree so that the fibre fraction can be reused.

Prior-art technology suffers, however, from the problem that conventional combination plastic/fiber products frequently contain plastics of low molecular weight (e.g., hot-melt glues), which in aqueous defibering are easily carried through into the fiber reuse process and cause impairment of paperboard or paper product produced by such a process. Furthermore, detachment of a pure polymer coating or plastic layer from a laminate structure is extremely difficult in aqueous defibering due to the strong adherence of plastic on cellulose fibres. In pulping, such combination materials must be treated so vigorously that the detached plastic is torn into small pieces that, despite the long washing times employed, still contain plenty of paper fibres. The resultant plastic scrap finds hardly any recycling use, and consequently, its typical fate is combustion or dumping. Finally, the fibre fragmentation into so-called fines is promoted by the elongated aqueous defibering and relatively high temperature employed in waste paper furnish preparation process.

To overcome the above-described drawbacks, the plastics industry has developed polymers soluble in acidic or basic conditions. Such polymers have also been used in different types of laminates and similar products.

The EP Patent Specification No. 316,676 describes adhesive layers for labels etc. that are soluble in basic conditions. The adhesive layers employed here are copolymers of acrylic or methacrylic acid and acrylate or methacrylate, respectively. The solubility property is designed to aid removal of labels from, e.g., bottles and similar objects.

Polymer layers made of corresponding copolymers have also been used for binding notebooks and similar items as is described in the EP Patent Specification No. 330,997. For recycling the pages of such notebooks, soaking in an alkaline aqueous solution is used for unbinding of the pages. A paperboard or paper sheet can be bonded onto such an adhesive layer so forming the cover or front page of a notebook. The above-described polymer-paper laminate is made using wide-slot lip die extrusion. The publication does not make it clear that the laminate structure would also be decomposable under alkaline wash treatment or that this prior-art method would aim at recovery of the polymer component.

The EP Published Patent Application No. 88,373 describes the binding of a book with the help of a polymer layer comprised of a polyvinyl alcohol layer and an adhesive layer. Such a mere PVA layer is soluble in hot water, of course, but while also being sensitive to moisture, it is not suited to, e.g., the conditions occurring in the use of conventional packages.

The U.S. Pat. No. 3,968,310 describes the coating of a paper web with a hot-melt type composition by way of brush application of said composition onto the web. The applied polymer layer was, in alkaline pulping conditions, detachable from the paper web, which could then be recycled.

The U.S. Pat. No. 5,096,767 discloses a laminate having, placed between a non-water-soluble polymer layer and the paper web, a plastic layer which is alkali soluble at elevated temperature. The laminate is intended for use as a bottle label which in normal conditions is moistureproof, but detaches from bottle wall in an alkali wash treatment at approximately 70° C. The alkali wash treatment results in complete disintegration of the laminate, thereby making the laminate incompatible with recycling.

As is evident from the discussion above, none of the conventional laminate embodiments have been able to combine good moisture resistance with recyclability.

SUMMARY OF THE INVENTION

It is an object of the present invention to overcome the drawbacks of conventional technology and to provide a laminate which has good moisture resistance properties and whose plastic and paper fibre layers can be separated from each other by repulping, thus making them compatible with recycling.

The invention is based on the principle of adhering an essentially non-water-soluble layer to a cellulose fibre web with the help of a homogeneous polymer layer that is water-soluble already in neutral pH conditions and at the normal ambient temperature in a factory. According to the invention, to make the non-water-soluble polymer layer adhere to the cellulose fibre web during the manufacture of the laminate, a water-soluble polymer is employed that, in the molten state, has at least a relatively high thermal endurance.

More specifically, the laminate according to the invention contains at least one first layer made from cellulose fibers, at least one second layer spaced apart from the first layer, and made from a material that is substantially non-water-soluble, and at least one third layer between the first and second layers and bonding them together, which third layer substantially comprises a polymer that is water-soluble at neutral pH conditions and exhibits a decomposition temperature of at least 160° C.

Furthermore, the present invention is directed to a method for producing this laminate by forming the third layer by extrusion into the nip formed between two webs.

The present invention is also directed to a method using the laminate as a packaging material suitable for packages that are to be recycled.

BRIEF DESCRIPTION OF THE DRAWINGS

FIG. 1 shows the basic structure of a paperboard laminate for liquid product packaging.

FIG. 2 shows the structure of a wrapper laminate for paper rolls.

FIG. 3 shows the structure of a weather-proof laminate.

FIG. 4 shows the structure of a heat-sealable laminate for the end headers of paper rolls.

DETAILED DESCRIPTION OF THE INVENTION

The invention provides a recyclable laminate incorporating at least one cellulose fibre layer and typically at least one non-water-soluble polymer layer, or alternatively, a second cellulose fibre layer, said laminate having at least one water-soluble polymer layer situated between two or multiple layers so that said water-soluble polymer layer is always immediately adjacent to any cellulose fibre layer.

According to a first preferred embodiment of the invention, the laminate comprises a cellulose fibre layer, a non-water-soluble polymer layer and a water-soluble polymer layer which interbonds said two former layers. Such a laminate exhibits good heat-sealability as its one surface is comprised of a non-water-soluble polymer layer.

According to a second preferred embodiment of the invention, the laminate incorporates two cellulose fibre layers and two (thermo)plastic polymer layers, the laminate comprising a cellulose fibre layer, a water-soluble polymer layer, a non-water-soluble polymer layer, a water-soluble polymer layer and a cellulose fibre layer, in said order. Such a laminate is particularly suited to applications requiring particularly high weather resistance.

According to a third preferred embodiment of the invention, the laminate incorporates two thermoplastic polymer layers and a cellulose fibre layer, the laminate comprising a non-water-soluble polymer layer, a water-soluble polymer layer, a cellulose fibre layer, a water-soluble polymer layer, and a non-water-soluble polymer layer, in said order. By placing the non-water-soluble polymer layers as the outer surfaces of the laminate, a liquid-tight laminate is obtained suited to applications in, e.g., liquid product cartons.

According to a fourth preferred embodiment of the invention, the laminate incorporates two cellulose fibre layers laminated to both sides of a water-soluble polymer layer. This type of laminate can be used as a packaging wrapper for, e.g., paper rolls.

In the context of the present application, "a water-soluble polymer" refers to any thermoplastic polymer capable of losing its adhesion, that is, its adhering capability in water. For the function of the invention, it is therefore essential that said water-soluble polymer detaches in water from said adjacent layer. In practice, as the water-soluble polymer layer is placed immediately adjacent to the cellulose fibre layer, water permeates through said fibre layer into the polymer layer, whereby the water-soluble polymer layer is primarily detached from the cellulose fibre layer. For the function of the invention, it is sufficient that said layer is separated by the effect of water from the cellulose fibre layer. Said layer can be allowed to continue to adhere to the plastic layer. By suitable control of the conditions, however, the polymer layer can be detached also from the adjacent polymer layer. This occurs, e.g., when the pulping process is continued for a sufficiently long time or the non-water-soluble polymer layer is at least moderately water-permeable.

As is evident from the discussion above, the invention does not necessarily require that the layer structure of the water-soluble polymer be disintegratable in water nor that it be "soluble" in the conventional sense, but rather, for the function of the embodiment according to the invention, it is sufficient that the adhesion can be essentially weakened.

To attain efficient separation of the different layers of the laminate structure in the aqueous defibering process, it is important that the water-soluble polymer assumes the form of an at least substantially homogeneous layer in said laminate structure. This is because the purpose of the laminating polymer layer is to separate the functional fibre and polymer layers of the laminate from each other so that these layers are not immediately bonded to each other, but instead, via a water-soluble polymer layer. Here, a "homogeneous" layer refers to such a layer that, with a possible exception at the borders of the laminate, entirely covers the area of the adjacent layer.

A particularly preferred type of the water-soluble polymer is an extrudable thermoplastic polymer suited to the production of a homogeneous film with an appropriate thickness. The use of such plastics makes it possible to provide the laminate in the final product with multiple properties particularly required from packaging materials such as impermeability to moisture vapour, heat-sealability, and printability. Such advantageous properties could not be attained through the use of other water-soluble polymers having a short-chain structure typically found in so-called "hot-melt" compositions or glues.

The selected polymer material is presumed to tolerate a temperature of at least 160° C. Namely, this temperature is required for a satisfactorily strong bonding of the polymer onto the cellulose fibre and polymer layers. Since the process temperature in laminate manufacture practically never exceeds 330° C., this temperature can be set as the upper limit of thermal endurance of the water-soluble polymer material.

Further, the polymer must be soluble (in the sense of this term defined above) in the conditions that are common in a pulper, that is, in essentially neutral pH conditions at the normal factory ambient temperature. The term "essentially neutral pH conditions" in the context of this application refers to a pH range from approximately pH 5 to approximately pH 8 and the term "normal factory ambient temperature" to a temperature range of approximately 10° to 50° C., typically approximately 5° to 30° C. Obviously, many of the polymers used according to the invention are also soluble outside the above limits.

The water-soluble polymer used in the laminate structures according to the invention can be any thermoplastic polymer (remeltable plastic) which fulfills the above-listed requirements. According to a preferred embodiment, polyvinyl alcohol based polymers which thus contain repeating units according to the formula —(CH(OH)—CH$_2$)—. A particularly suitable polymer is polyethylene grafted with polyvinyl alcohol. The polyvinyl alcohol renders the polyethylene the desired solubility whose degree can be controlled by varying the proportion of polyvinyl alcohol in the polyethene backbone. The proportion of the polyvinyl alcohol in the grafted polyethylene is typically 0.5 to 50 wt. %, preferably approximately 5 to 30 wt. %. This kind of polymer alone can already render the final product laminate structure a moderate moisture vapour barrier capability, because it can tolerate a relatively high ambient moisture content without disintegration. A laminate of particularly high moisture vapour barrier capability is attained by complementing the soluble polyethene with a non-water-soluble polyethene layer. The melting point of the described polymer is approximately 120° C.

and it can tolerate as an extruded film more than 260° C. at which temperature it adheres well to cellulose fibre layers and thermosetting plastic films.

Another vinyl alcohol based polymer which also is preferably suited for use according to the invention is comprised of the copolymer of vinyl alcohol and ethylene having a high proportion of vinyl alcohol residues, typically approximately 10 to 95 wt. %, preferably approximately 30 to 80 wt. %. Also in this polymer type the solubility properties can be controlled by varying the proportion of the vinyl alcohol residues.

Besides the above-listed particularly preferred polymers, also other types of water-soluble polymers can be used that contain both monomers of the water-soluble polymer and monomers of the non-water-soluble polymer. Thus, applicable polymers comprise, e.g., the copolymers of vinyl alcohol and propene, terpolymers of vinyl alcohol, ethylene and propylene as well as polypropylene grafted with polyvinyl alcohol and the copolymers of ethylene and propylene grafted with polyvinyl alcohol.

The surface area weight of the water-soluble polymer layer in the laminate is typically approximately 0.1 to 50 g/m$^2$, preferably approximately 3 to 30 g/m$^2$.

In addition to the water-soluble polymer layer, the laminates according to the invention comprise at least one layer comprised of cellulose fibres and at least one third layer which is non-water-soluble. The latter can be composed of cellulose fibres or of a polymeric material. The cellulose fibre layers in the laminate can be paper webs, paperboard webs or similar cellulose based products. The cellulose contained in the layers can stem from chemical or mechanical pulp which further can be bleached or unbleached pulp. The surface area weight of the material used for the cellulose fibre layer is typically approximately 10 to 500 g/m$^2$. Typically, paperboard with a surface area weight of approximately 100 to 250 g/m$^2$ is employed. The polymer layers of the laminate can be formed from thermoplastic polymers such as olefin, ester, vinyl, styrene or similar polymers. Different types of copolymers are also suitable for use in the polymer material layers. Example 2 describes such use of ethylvinyl acetate copolymer in a laminate according to the invention. Replacing the polymer or the cellulose fibre material, so-called regenerated cellulose polymer materials such as cellophane are also applicable. The surface area weights of the polymer layers in the laminate are in the range of approximately 1 to 250 g/m$^2$, preferably approximately 5 to 100 g/m$^2$. As the cellulose fibre layers and the non-water-soluble polymer layers form the actual structural components in the laminate, they are typically formed to be thicker than the soluble polymer layer.

For special applications (e.g., juice cartons), the laminates can further be provided with metal foils such as aluminium foils. These can be coated with, e.g., a polyolefin to attain heat-sealability.

The invention also concerns a method for producing a recyclable laminate, according to which method a water-soluble polymer layer is adhered to the cellulose fibre layer and/or the non-water-soluble polymer layer by the extrusion coating/laminating method. This method is capable of producing the water-soluble polymer material into such a homogeneous film for the laminate structure that in a single work stage, together with the other layer elements of the laminate, can be treated at a sufficiently high temperature (above 160° C.) so that non-water-soluble layers (cellulose fibre and polymer layers) can be made to adhere to the water-soluble polymer.

The method can also be implemented using extrusion coating, the water-soluble polymer being produced by extrusion into a sheet which is adhered to the surface of the cellulose fibre web. The second, non-water-soluble layer of the laminate, which is adjacent to the other side of the water-soluble layer is here adhered at another stage.

Preferably, however, the method is implemented using extrusion laminating which operates by feeding said polymer sheet from the extruder between at least two webs and then adhering it to these. One or both of the webs can be formed by a cellulose fibre web and/or the second polymer material. The method is implemented particularly advantageously using the coextrusion technique in which all polymer layers of the laminate are produced in a single stage in a coextruder.

According to the first preferred embodiment of the invention, a laminate comprised of a cellulose fibre layer, a water-soluble polymer layer and a non-water-soluble polymer layer (in said order) are produced preferably using two-layer coextrusion. The combination of the water-soluble polymer film and the non-water-soluble polymer film produced by coextrusion is applied onto the cellulose fibre web at a temperature above 160° C. According to a second preferred embodiment of the invention, the five-layer laminate having the innermost layer made from a non-water-soluble polymer is produced in a similar way by using three-layer coextrusion, the polymer materials of the laminate being applied as coextruded films in the nip formed between two cellulose fibre webs. According to a third preferred embodiment, the five-layer laminate having the innermost layer made from a cellulose fibre web is produced by pair-wise coextruding the polymer layers to be applied to both sides of the cellulose fibre web.

The laminates according to the invention can be produced into packaging materials, bags, wrappers, moisture-proof papers and similar products exhibiting moisture vapour barrier capability. As the laminate according to the invention offers wide variability, the required properties of the final product can be attained without compromises. This is particularly important for the use of the cellulose fibre/polymer layer laminates in food product packages whose recycling rate is growing rapidly, yet without compromising their barrier properties to moisture, gases and even liquids. Paperboard grades for liquid product packages, e.g., milk and juice cartons, are preferred applications for the pulping-compatible laminates described above.

A typical example of the pulping-compatible laminate product according to the invention is also a paper roll wrapper formed by coextrusion laminating a water-soluble polyethylene layer between two liner board sheets. The end headers for such wrapper are made from paper webs coated according to the invention. Such paper webs coated according to the invention are produced using conventional coextrusion techniques and they are heat-sealable, which further expands the application range of the recyclable cellulose fibre/polymer laminates according to the invention in industry, particularly in the packaging branch.

The invention offers significant benefits. Particularly, laminates according to the invention are entirely recyclable, the cellulose fibre and polymer layers inclusive, which, in accordance with the above description is based on the concept of having the cellulose fibre layer coated with a polymer layer exhibiting loss of adhesion through soaking in water. If a polymer layer naturally exhibiting strong adhesion to the fibre material is adhered to this water-soluble polymer layer, such insoluble polymer layer is detached in the form of a sliced film along with the water-soluble layer detaching from the cellulose fibre layer during soaking. By virtue of the water-soluble polymer layer, the pulping of laminates according to the invention is thus converted into a rapid, efficient and thereby energy-saving method of reclaiming and recycling the laminate, both the fibre layer and plastic layer elements inclusive. During the pulping of the laminates, the separated polymer particles retain a larger shape than those obtained from conventional laminates, thus providing easier reclaiming for reuse.

In the following, the invention will be examined in greater detail with the help of exemplifying embodiments illustrated in the attached drawing. It should be pointed out that that the descriptions of the diagrams and exemplifying embodiments below are intended to elucidate the applications of the invention, and they must by no means be interpreted to limit the scope of the invention. The examples cover laminates suited for industrial sector use in the production of, e.g., bags, wrappers and moisture-proof papers.

FIG. 1 illustrates the structure of a paperboard laminate for liquid product cartons. Such a laminate comprises five layers, the water-soluble polymer layers 1 being arranged at both sides of a cellulose fibre layer 2. Non-water-soluble polymer layers 3, 3' are further arranged as the outer (3) and inner (3') layers, respectively, of the laminate.

In the embodiment according to FIG. 2, the laminate comprises three layers, namely cellulose fibre layers 4 and an interbonding polymer layer 1 made of a material soluble in water.

FIG. 3 illustrates a five-layer laminate having the outer layers 4 comprised of cellulose fibre web, the inner layer 5 made of a non-water-soluble polymer and the interbonding layers 1 made of a material soluble in water.

FIG. 4 illustrates a laminate having a structure according to the basic embodiment of the invention, in which the water-soluble polymer layer 1 interbonds the cellulose fibre layer 4 and the non-water-soluble polymer layer 6.

The production of the laminates shown in the diagrams are described in detail in the following examples:

EXAMPLE 1

Production of five-layer paperboard laminate for liquid product cartons

A laminate according to FIG. 1 was produced having its innermost layer made from paperboard 2 with a basis weight of 300 to 320 g/m². A water-soluble polymer layer 1 made from a copolymer of polyethene and polyvinyl acetate was adapted to both sides of this paperboard layer 2. To act as the outer surface polymer layer 3, over the water-soluble polymer layer was adapted a polyethene layer with a surface area weight of 10 g/m². Also made from polyethene, the inner surface layer 3' had a surface area weight of 25 g/m². In the laminate according to FIG. 1, the polyethylene layer with the water-soluble polymer layer adhering to it were coextruded onto the paperboard layer 2, and so was applied to the inside surface of the paperboard the polyethylene layer with the water-soluble polymer layer adhering to it.

EXAMPLE 2

Production of three-layer wrapper laminate

A paper roll wrapper laminate was produced by extrusion laminating having a structure illustrated in FIG. 2. The innermost layer of the wrapper laminate, that is, the water-soluble polymer layer 1 had a surface area weight of 30 g/m², while UG Kraft paper layers 4 placed to both sides of it had a surface area weight of 60 g/m² each. The water-soluble polymer layer was made from ethylene polymer grafted with polyvinyl alcohol, produced by Neste Oy with the trade name NCPE 0210, having a melt index of 6.0 g/10 min and density of 1140 kg/m³. The layer solubility in water could be controlled by varying the polyvinyl alcohol content in the polyethylene. The UG Kraft paper grade employed in the wrapper was a kraft grade produced by Yhtyneet Paper-itehtaat Oy.

The product was made by extrusion laminating at 240° C. The layers adhered well to each other, that is, the mutual adhesion was good. After use as a roll wrapper, the product was pulped at approximately 25° C. in an aqueous defibering unit adjusted to neutral pH conditions. The paper fibres separated entirely intact from each other in a 10 min treatment. The pulping of a conventional paper/polyethylene/paper combination laminate typically requires a two- to three-fold time and yet leaves the fibres contaminated with plastic.

EXAMPLE 3

Production of five-layer weatherproof laminate

A laminate product according to FIG. 3 with a particularly high weather-proofness was produced using three-layer coextrusion. The innermost layer of the laminate formed by the non-water-soluble polymer layer 5 had a surface area weight of 30 g/m², the water-soluble polymer layers 1 applied to both sides of the innermost layer had a surface area weight of 5 g/m². The outermost layers were formed by UG Kraft paper layers 4 (with a surface area weight of 125 g/m² each). The non-water-soluble polymer grade employed was a polyethylene-based plastic produced by Neste is Oy with the trade name NCPE 0414, having a melt index of 1.7 g/10 min and density of 927 kg/m³. The water-soluble polymer NCPE 0210 adheres remarkably well to this insoluble polymer. The NCPE 0414 polymer grade confers the product good moisture vapour barrier properties and the product is found to store without degradation even in humid conditions. The fibres separate easily in aqueous defibreing, and by virtue of the water-soluble polymer layers, the innermost layer stays as a pure layer of plastic easily reclaimable and recyclable for reuse.

EXAMPLE 4

Production of three-layer packaging laminate

An easily heat-sealable laminated paper roll end header was produced through two-layer coextrusion (FIG. 4). The center layer 1 was, made from water-soluble polymer NCPE 0210 having a surface-area weight of 5 g/m². The heat-sealable polymer layer 6 was made to a surface area weight of 35 g/m² from a 9% blended ethylvinyl acetate copolymer EVA NCPE 5009 by Neste having a melt index of 8 g/10 min and density of 929 kg/m³. Finally, the laminate had a base layer 4 made from UG Kraft having a basis weight of 150 g/m².

Also in this example the adhesion of the outer polymer layer to the base paper layer was rapidly weakened in aqueous defibreing by virtue of the water soluble layer of NCPE 0210, thus permitting the separation of the laminate into intact plastic and paper components suitable for reuse.

What is claimed is:

1. A recyclable laminate, comprising:

(A) at least one first layer made from cellulose fibers;

(B) at least one second layer spaced apart from said first layer, wherein said second layer is made from a substantially non-water-soluble polymer material; and (C) at least one third layer between said first and said second layers which directly bonds to said first layer and bonds said first and second layers to each other, wherein said third layer comprises a polymer which is water-soluble at neutral Ph conditions and exhibits a decomposition temperature of at least 160° C.

2. The laminate as defined in claim 1, wherein said polymer has a decomposition temperature within the range from 160° to 330° C. and is suitable for processing by extrusion.

3. The laminate as defined in claim 1, wherein said polymer is water-soluble within the pH range from 6 to 8 and at a temperature in the range from 5° to 50° C.

4. The laminate as defined in claim 1, wherein said polymer is selected from the group consisting of polyethylene grafted with polyvinyl alcohol and a copolymer of vinyl alcohol and ethylene.

5. The laminate as defined in claim 4, wherein said polymer is polyethylene grafted with polyvinyl alcohol, and wherein the proportion of the polyvinyl alcohol in the polyethylene is in the range from 0.5 to 50 wt. %.

6. The laminate as defined in claim 1, wherein said second layer (B) comprises a non-water soluble thermoplastic polymer.

7. The laminate as defined in claim 6, wherein said second layer comprises polyethylene.

8. The laminate as defined in claim 1, wherein said second layer comprises a cellulose fiber layer.

9. The laminate as defined in claim 1, wherein said laminate comprises two first layers and two third layers, and comprises a cellulose fiber layer, a water-soluble polymer layer, a non-water-soluble polymer layer, a water-soluble polymer layer, and a cellulose fiber layer, in that order.

10. The laminate as defined in claim 1, wherein said laminate comprises two second layers and two third layers, and comprises a non-water-soluble polymer layer, a water-soluble polymer layer, a cellulose fiber layer, a water-soluble polymer layer, and a non-water-soluble polymer layer, in that order.

11. The laminate as defined in claim 1, wherein said non-water-soluble material of the second layer and the cellulose fibers of the first layer can be separated from each other by aqueous defibering of the laminate in neutral pH conditions, whereby the material components of the first and the second layer can be reclaimed separately from each other in the form of substantially homogeneous layers.

12. The laminate as defined in claim 6, wherein said water-soluble material component can be separated by aqueous defibering of the laminate from said cellulose fiber layer whereby said water-soluble material component continues to adhere to said non-water-soluble polymer layer.

13. The laminate as defined in claim 1, wherein said laminate is produced using the extrusion coating or extrusion laminating method.

14. A method for producing the laminate defined in claim 1, comprising:

extruding at least one material selected from the group consisting of said water-soluble polymer, and said non-water-soluble polymer material into at least one sheet; and adhering said sheet onto at least one layer selected from the group consisting of said cellulose fiber and said non-water-soluble polymer by heating to a temperature sufficiently high to cause said water-soluble polymer of said sheet to adhere to said layer.

15. The method as defined in claim 14, wherein said extruding comprises extruding a sheet of said water-soluble polymer layer and a sheet of said non-water-soluble polymer layer onto said cellulose fiber layer.

16. The method as defined in claim 14, wherein said extruding comprises extruding a sheet of said water-soluble polymer layer into a nip formed between two cellulose fiber layers.

17. The method as defined in claim 14, wherein said extruding comprises extruding a sheet of a polymer film combination comprising a non-water soluble polymer center layer coated on both sides by water-soluble polymer layers into the nip formed between two cellulose fiber layers.

18. The method as defined in claim 14, wherein said extruding comprises extruding a sheet of a polyethylene polymer layer grafted with polyvinyl alcohol into the nip formed between two base layers.

19. A packaging material suitable for recycling comprising the laminate defined in claim 1.

* * * * *